United States Patent [19]

Karlsson

[11] Patent Number: 5,273,011
[45] Date of Patent: Dec. 28, 1993

[54] ARRANGEMENT FOR CONVERTING LINEAR MOTION FROM A POWER SOURCE TO A ROTARY MOTION

[76] Inventor: Hans Karlsson, Vintervägen 17, S-175 40 Järfälla, Sweden

[21] Appl. No.: 964,961

[22] Filed: Oct. 22, 1992

[30] Foreign Application Priority Data

Oct. 29, 1991 [SE] Sweden .................. 9103167

[51] Int. Cl.$^5$ .............................................. F16H 25/08
[52] U.S. Cl. .................................. 123/56; 123/197.4;
123/74 AE; 74/55; 74/569; 74/579 R
[58] Field of Search ............... 123/56 C, 197.4, 197.3,
123/74 AE; 74/55, 569, 579 R

[56] References Cited

U.S. PATENT DOCUMENTS

| | | | |
|---|---|---|---|
| 1,505,856 | 8/1924 | Briggs | 123/197.4 |
| 1,510,677 | 10/1924 | Jory | 123/197.4 |
| 1,687,425 | 10/1928 | Briggs | 123/197.4 |
| 1,784,902 | 12/1930 | Maurais | 74/55 |
| 1,790,198 | 1/1931 | Cizek | 74/55 |
| 3,020,885 | 2/1962 | Weinstock et al. | 74/107 |
| 5,031,470 | 7/1991 | Karlsson | 123/56 C |

Primary Examiner—Tony M. Argenbright
Assistant Examiner—M. Macy
Attorney, Agent, or Firm—Nies, Kurz, Bergert & Tamburro

[57] ABSTRACT

An arrangement for converting linear motion from a power source to rotary motion, wherein the power source is intended to coact with a cam curve so as to generate rotary motion, the rotary motion being performed by an axle; wherein the arrangement includes a rod (4) or corresponding element which is connected to a piston (31) mounted for reciprocating movement in a cylinder (30; 50) through the action of a pressure medium which is intended to act on that side of the piston (31) which is opposite to that side on which the rod (4) is connected to the piston, and further comprises the cam curve (2) which is mounted on one end of the rod (4) and which has curved parts (5) solely on that side thereof which faces away from the rod (4), and wherein the arrangement includes second means which comprises two opposing wing-shaped parts (6, 7) which project outwards away from the axle and which are firmly connected to the axle (3), and wherein a roller (8, 9) is mounted on the outer part of each of the wing-shaped parts and is intended to roll against the cam curve (2). The invention is characterized in that the piston rod (4) moves through a hole (36) provided in a lower wall (37) of the lower part of the cylinder, so that the cylinder space located beneath the piston essentially forms a chamber (38); in that when occupying its upper and its lower position, the cam curve will be located on the opposite side of the lower wall (37) in relation to the piston (31); in that the chamber (38) has at least one connection (32, 40;51, 40) with the surroundings; and in that the connection (32, 40; 51, 40) is so constructed that an overpressure will be generated in the chamber (38) as the piston (31) is moved from its upper position to its lower position.

8 Claims, 3 Drawing Sheets

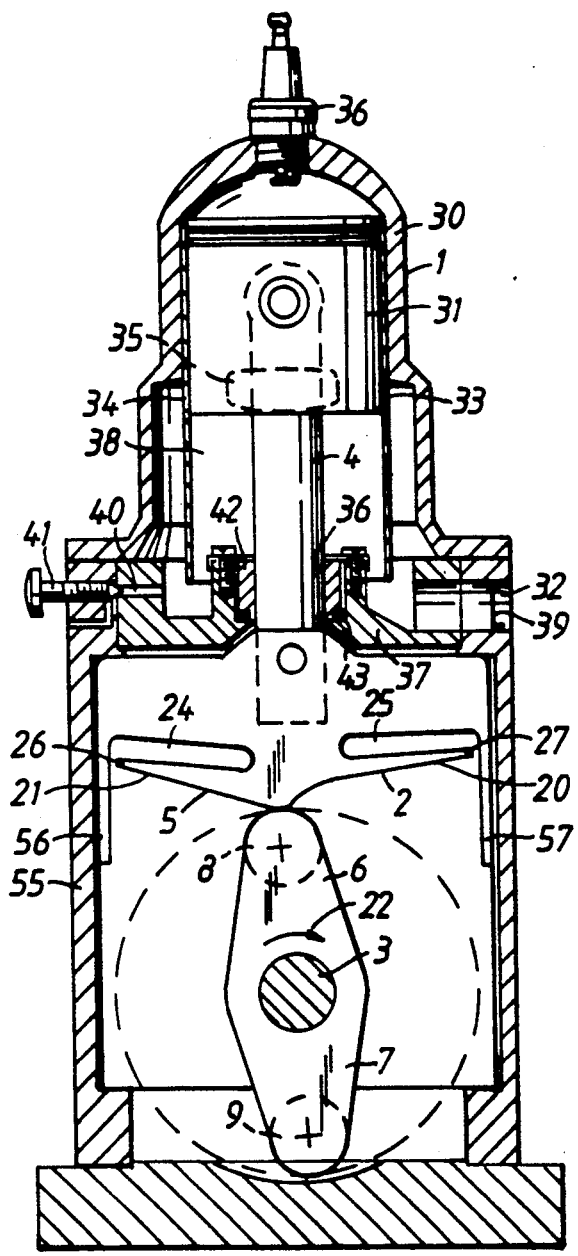

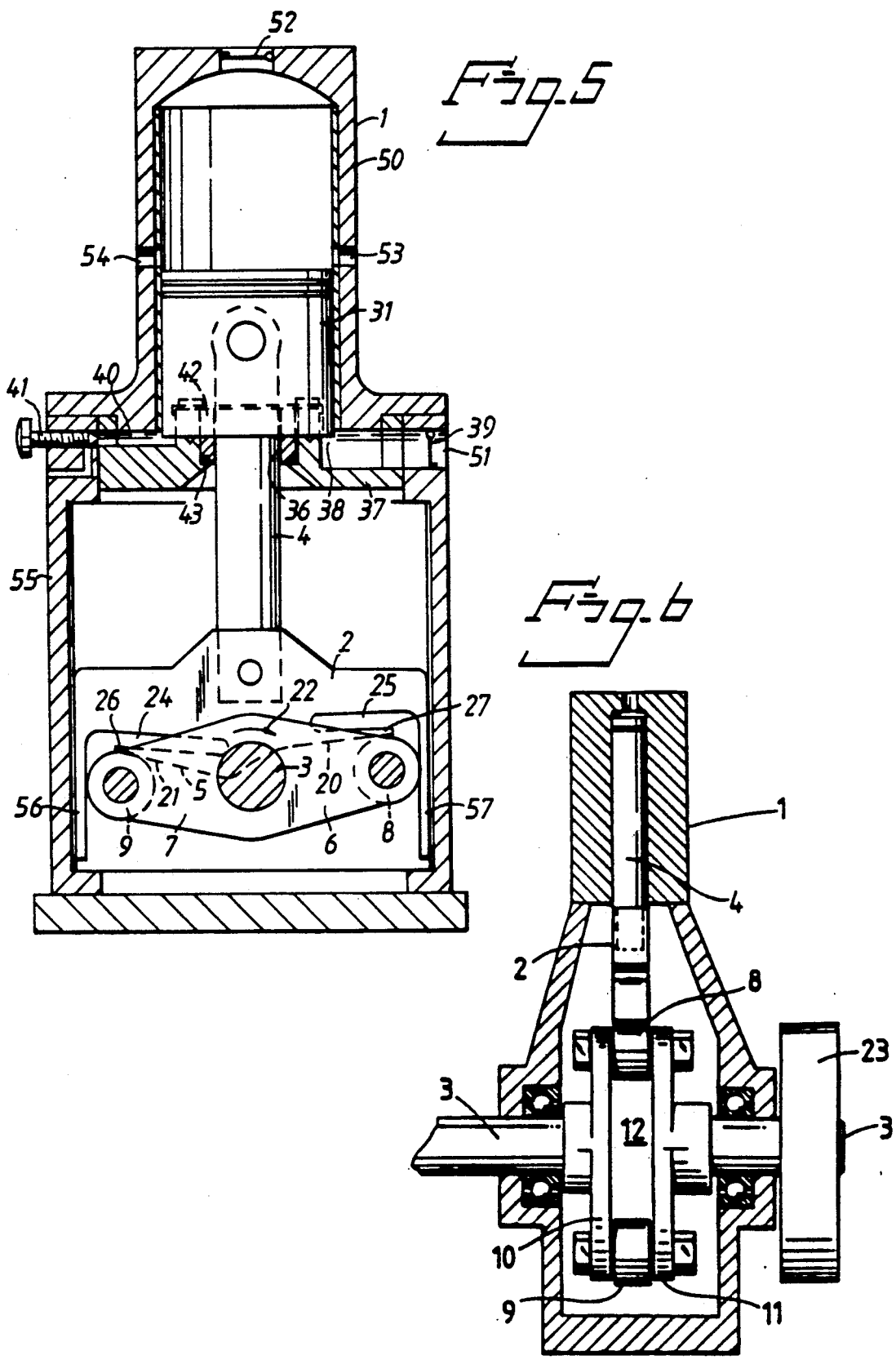

ARRANGEMENT FOR CONVERTING LINEAR MOTION FROM A POWER SOURCE TO A ROTARY MOTION

The present invention relates to an arrangement for converting linear motion from a drive source to rotary motion.

The invention finds its primary application in the conversion of reciprocating linear motion of pistons that form part of a power source, such as an explosion engine or a compressed-air engine. However, the invention is not restricted to any particular kind of application.

Swedish Patent Specification No. 8901653-9, which corresponds to U.S. Pat. No. 5,031,470, describes an arrangement for converting linear motion to rotary motion with the aid of cam curves, said rotary motion being the rotational movement of a shaft or axle. According to the invention, the arrangement comprises a first means which includes a rod or corresponding member which is intended to move reciprocatingly and a cam curve which is mounted on one end of the rod and which solely has curved parts on the side thereof that is remote from the rod. A second means includes two opposing wing-shaped parts which extend outwardly from the shaft or axle and are fixedly connected thereto, wherein a roller or corresponding device is rotatably mounted on the outer part of each wing. The rollers are intended to roll against the cam curve, so as to convert linear motion to rotary motion.

The arrangement taught by said patent specification will produce a higher maximum moment of force than a conventional crank shaft at the same available length of stroke. Furthermore, force is exerted on a crank shaft only once with each revolution, although then during one-half of a revolution. With two piston-cylinder devices connected with a phase difference of 180°, two moment peaks are obtained, however, with each revolution.

With two cylinders and two cam discs, the arrangement taught by said patent specification obtains four moment peaks with each revolution while, at the same time, one of said means is always in force-exerting engagement with one of the cam curves. However, there is obtained a shaft-revolution, calculated with each piston-cylinder stroke, which is half that obtained with a shaft which is driven by two piston-cylinder devices through the intermediary of a crankshaft.

The arrangement taught by this patent specification thus affords advantages over the use of a conventional crankshaft for converting linear motion to rotary motion.

However, tests carried out with the arrangement taught by this patent specification have shown that initial contact of the cam curve with the rollers on the wing-shaped device is a hard contact. This problem is manifested essentially solely with the roller which presses up the piston during its return stroke. This initial contact is more of an impact than a soft or gentle engaging force. Basically, the problem arises because this contact between cam curve and roller is not quided mechanically.

This drawback is eliminated by the present invention.

The present invention thus relates to an arrangement for converting linear motion from a power source to rotary motion, wherein the power source is intended to coact with a cam curve to generate rotary motion, said rotary motion being performed by a shaft or axle, wherein the arrangement includes a rod or the like connected to a piston of a piston-cylinder device for performing reciprocatory linear motion, with the aid of a pressure medium which is intended to act on that side of the piston which is opposite to the side on which the rod is connected to the piston, wherein the cam curve is attached to one end of the rod and has curved parts solely on that side of the cam curve which lies remote from the rod; wherein the arrangement further comprises second means which include two opposing wing-shaped parts which project outwardly from the shaft or axle and which are connected firmly to said shaft or axle, wherein the outer part of each wing carries a rotatable roller or the like, said rollers being intended to roll against said cam curve, said arrangement being characterized in that the piston rod passes through a hole in a lower wall of the lower part of the piston-cylinder device, so that the cylinder space located beneath the piston essentially forms a chamber; in that when the cam curve is in its upper position and also when it its lower position, the cam curve is located on the opposite side of said lower wall in relation to the piston; and in that said chamber has at least one connection with the surroundings; and in that said connection is constructed so that an overpressure is generated in the chamber when the piston is moved from its upper position to its lower position.

The invention will now be described in more detail with reference to exemplifying embodiments thereof and also with reference to the accompany drawings, in which FIG. 1 is a side view of an inventive arrangement which includes a power source in the form of a two-stroke internal combustion engine, and shows the piston of said engine in its top dead-centre-position;

FIG. 5 is a side view of an inventive arrangement which includes a power source in the form of a compressed-air engine, and shows the piston on its lower-most position; and FIG. 6 is a view taken from the right in FIG. 1 and shows the lower part of the inventive arrangement.

Figure 4:
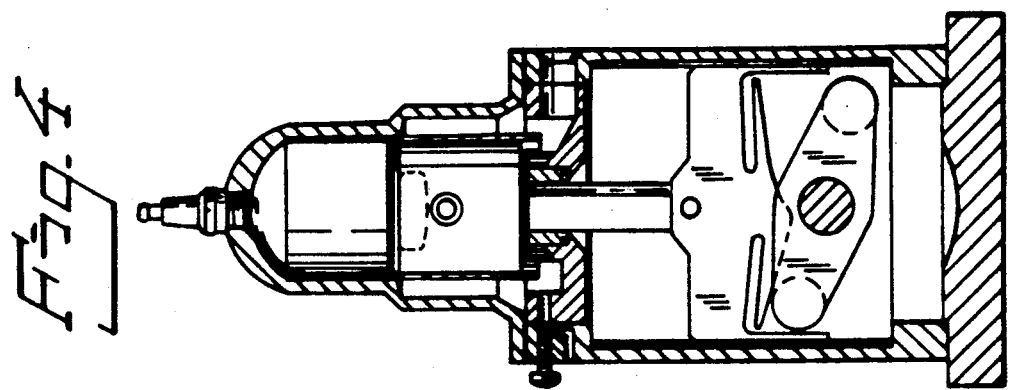
FIGS. 2–4 illustrate the arrangement of FIG. 1 with the axle in different positions of rotation.

The inventive arrangement functions to convert linear motion from a power source 1 to rotary motion, where the power source is intended to coact with a cam curve 2 in a manner to generate rotary motion, this rotary motion being performed by an axle or shaft 3.

The inventive arrangement includes a first means which includes a rod 4 or the like, which is intended to carry out reciprocatory linear movement, and the aforesaid cam curve 2. The cam curve 2 is mounted on one end of the rod 4. The rod 4 belongs to the power source and in the case of the illustrated embodiment has the form of a piston rod. The cam curve 2 has curved parts on solely the surface 5 which faces away from the rod.

The inventive arrangement also comprises second means which includes two opposing wing-shaped parts 6, 7 which project out from the axle 3 and which are firmly connected to said axle. Rotatably mounted on the outer part of each wing is a roller 8, 9 or like device which are intended to roll on the cam curve 2.

The two mutually opposing and outwardly projecting wing-shaped parts 6, 7 are formed by two mutually parallel wing-shaped carrier means 10, 11 between whose outer parts the rollers 8, 9 are carried, see FIG. 6. Each of the wing-shaped carrier members is connected to a part of the axle 3 which projects outwardly from the centre part of respective wing-shaped carrier members. As shown in FIG. 6, the axle 3 is a two-part axle, i.e. is not continuous, and that an open space 12 is formed between the wing-shaped carrier members 10, 11.

The cam curve 2 includes two curved parts 20, 21 (see FIG. 1), of which the first part 20 is intended to coact with the aforesaid rollers 8, 9 when the rod 4 carries out a working stroke, whereas the second part 21 is intended to coact with the rollers 8, 9 so as to return the rod. The two curved parts 20, 21 merge with one another approximately at the centre of the cam curve and form a continuous curve.

Figure 2:
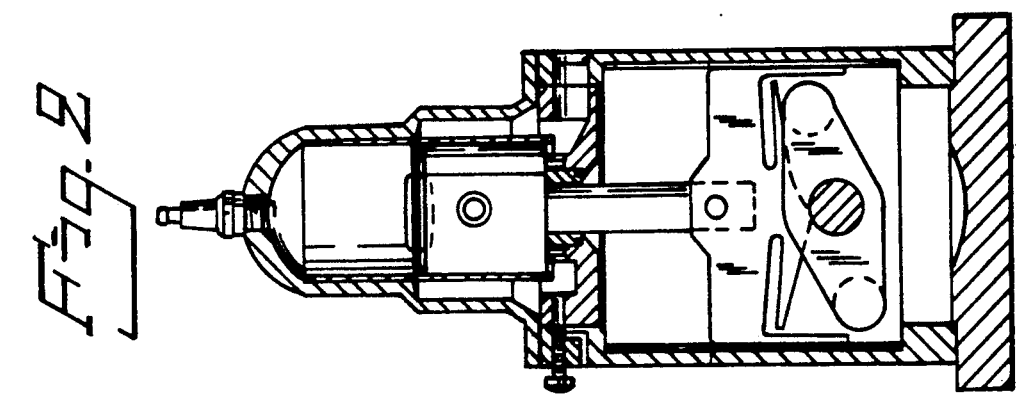

FIGS. 1-4 illustrate a working stroke and a return stroke. FIG. 1 illustrates the arrangement in a starting position. The axle 3 is moved from this working position in the direction of arrow 22, due to the piston rod 4 moving the cam curve 2 downwards in FIG. 1. As the cam curve 2 moves downwards during its working stroke, the roller 8 rolls against the first part 20 of the cam curve. As the cam curve is moved downwards, the roller 8 moves further out on the cam curve, as shown in FIG. 2, until reaching the position shown in FIG. 2. The working stroke is complete when this latter position is reached.

Figure 3:
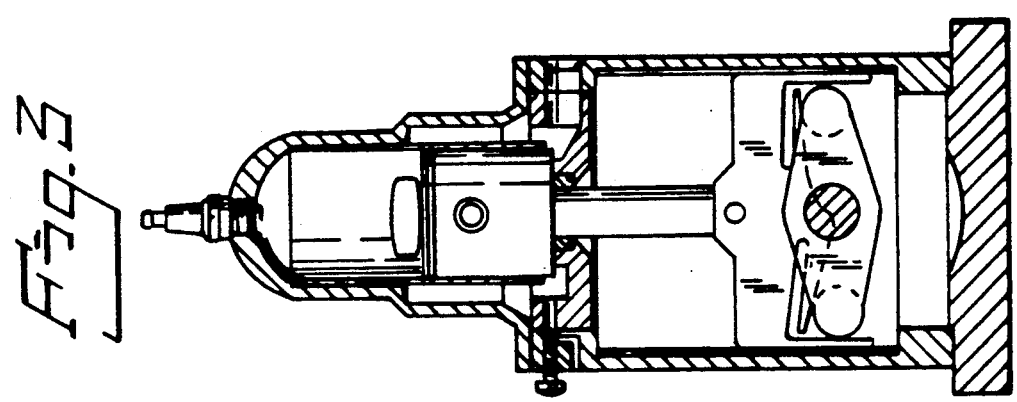

As will be seen from FIGS. 2 and 3, the lowermost part of the cam curve pass the level on which the axle 3 is located. This is the reason why the axle 3 is a two-part axle. However, it is not necessary to construct the arrangement in a manner which will permit the cam curve to pass the level on which the axle is located, although the illustrated construction enables the arrangement to be given a much smaller vertical extension or height.

According to one embodiment, the arrangement includes flywheel 23 (see FIG. 6) which when the working stroke has been completed functions to rotate the axle 3, whereupon the arrangement carries out a return stroke. This return stroke is illustrated in FIG. 4. The flywheel thus rotates the axle 3 in the direction of arrow 22. As will be seen from FIG. 4, the roller 9 therewith rolls against the second part 21 of the cam curve 2, while pressing the cam curve upwards until the position shown in FIG. 1 is reached. The return stroke has been completed when this latter position is reached. A working stroke is then commenced, with the roller 9 rolling against the first part of the cam curve, whereafter the arrangement performs a return stroke, and so on.

Thus, two moment peaks are obtained with the described arrangement with each full turn of the axle 3. It is obvious that the size of the moment for a given power source and also the distribution of said moment during a working stroke will depend on the curved configuration of the first part 20 of the cam curve. The first part 20 will preferably begin with a relatively steeply curved part, as shown in the Figures, so as to achieve thereby a relatively high starting moment. Since the roller acts further along the cam curve, as shown in FIG. 2, the first part of the cam curve may be relatively flat, since a high moment is obtained through the longer moment arm.

According to one preferred and highly beneficial embodiment of the invention, the two curved parts 20, 21 are so configured that when the working stroke is completed and one of the rollers 8 by means of which the working stroke was carried out abuts one curved part of the cam curve while the other, 9, of the rollers lies against the second curved part 21 of the cam curve, see FIG. 3. Alternatively, the other, 9, of said rollers is in near abutment at the end of the working stroke.

According to one preferred embodiment, the cam curve 2 is provided with a penetrating slot 24, 25 which extends generally parallel with and slightly beneath the curved parts 20, 21 against which a roller lies during the working stroke and return stroke respectively. These slots 24, 25 afford a given spring effect when the roller concerned comes into abutment with the curved parts 20, 21, wherewith the tongues 26, 27 formed by means of the slots 24, 25 will yield resiliently, or spring, to some extent.

In the case of the FIG. 1 embodiment, the piston rod 4 is connected to a piston 31 arranged in a cylinder 30. The piston 31 is moved backwards and forwards by means of a pressure medium, in the form of combustion gases, which acts on that side of the piston which is opposite the side on which the piston rod is connected to the piston. In the case of the embodiment illustrated in FIGS. 1-4, combustion gases are generated by a two-stroke internal combustion engine which includes an intake duct 32 to which a carburetor (not shown) is connected, and further includes intake ports 33, 34, an exhaust port 35 and a spark plug 36.

It was mentioned in the introduction that experiments carried out with an arrangement constructed in accordance with the earlier known patent specification showed that initial contact of the cam curve with the rollers on the wing-shaped member was harsh. This initial contact appeared to have the nature of a harsh impact contact rather than the nature of a soft or gentle contact. This applies essentially to the roller, the return roller, which engages the cam curve at the beginning of the return stroke.

This problem is basically caused because contact between the cam curve and the roller is not guided mechanically, and consequently the cam curve is moving upwards when the return roller comes into abutment with the cam curve. This contact has the form of an impact contact, despite the fact that the return roller comes into abutment with the cam curve at the same time as, or generally at the same time as the working roller abuts the cam curve in the lowermost position of said curve. This is probably because the spring in the cam curve results in a clearance between the return roller and the cam curve when the cam curve is in its lowermost position, said curve stopping in this lowermost position prior to being pressed upwards by the return roller.

According to the invention, this problem is solved by passing the piston rod 4 through a hole or bore 36 in a lower wall 37 of the bottom part of the cylinder, so that the cylinder space located beneath the piston generally forms a chamber 38 where the cam curve 2, both in its upper position and in its lower position, is located on the opposite side of lower wall 37 in relation to the piston 31, and where the chamber 38 has at least one connection with the surroundings. The aforesaid connection is constructed so as to form an overpressure in the chamber 38 when the piston 31 is moved from its upper position to its lower position.

According to one preferred embodiment, there is provided a connection in the form of a passageway which is intended to allow gas to enter said space upon the occurrence of a low drop in pressure as the piston moves from its lower to its upper position, said connection being closed when the piston moves from its upper to its lower position. In the FIG. 1 embodiment, this passageway is comprised of the combustion-gas intake duct 32.

In the case of the FIG. 5 embodiment, the power source is a compressed-air engine 50 and the passageway 51 corresponding to the aforesaid passageway is a simple connection with the surrounding atmosphere.

The connecting passaways 32, 51 are each provided with a check valve 39 or the like, which acts to close said passageway against transportation of gases in a direction away from the chamber 38 and out towards the surroundings.

However, it has been found beneficial to release a certain amount of gas from the chamber 38 when the piston moves from its upper to its lower position. To this end, there is provided a further connection in the form of a passageway 40 which connects the chamber 38 with atmosphere. Instead of this further connection, the aforesaid check valve can be constructed so as to allow a certain amount of gas to leak through the valve in its flow-blocking direction. Irrespective of whether the check valve is constructed for a given leakage or whether a further passageway 40 is provided, it is preferred to provide an adjustable constriction for the gas flowing from the chamber 38. In the case of the illustrated embodiments, this adjustable constriction has the form of a needle valve 41.

When the piston and the cylinder are parts of an internal combustion engine, the gases that pass into and exit from the space or chamber 38 are the gases of combustion. The gases which exit through the check valve or the needle valve can therewith flow back to the intake duct 32.

According to one preferred embodiment of the invention, a seal is provided between the hole 36 and the piston rod 4, this seal preferably having the form of a floating bushing 42. The floating bushing may be sealed against said wall 37, by means of an O-ring 43.

For the sake of clarity, only FIG. 1 of FIGS. 1–4 has been provided with reference numerals.

FIG. 1 shows the piston of the internal combustion engine in its top-dead-centre position, from which the working stroke of the piston shall commence.

FIG. 2 illustrates the expansion phase of the engine, where the expulsion of gases through the exhaust port has just commenced and the working roller is in the final stage of the working stroke.

FIG. 3 illustrates the bottom-dead-centre position of the piston, where the working roller has completed a working stroke and the return roller has just come into contact with the cam curve or is about to come into contact with said curve. The gas exhaust phase and suction phase of the engine take place in this position.

FIG. 4 illustrates the compression phase, during which the return roller presses the cam curve upwards, and therewith also the piston. Fuel mixture is also sucked in through the intake duct.

FIG. 5 illustrates an arrangement in which the power source is a compressed-air engine 50, as mentioned above. Compressed air is allowed to enter through a port 52 by means of a valve arrangement, not shown. The port 52 is provided with a check valve. The ports 53 and 54 are constantly open so as to allow compressed-air to exit upon completion of a working stroke, as illustrated in FIG. 5. As before mentioned, the passageway 51 functions to allow air to enter the chamber 38 as the piston moves from its lowermost position to its uppermost position.

The cylinder 55 in which the cam curve moves preferably has a rectangular cross-section, so as to provide a guide means which will prevent the cam curve from rotating or twisting about the longitudinal axis of the piston rod. Furthermore, the cam curve is so constructed in relation to the cylinder 55 as to prevent a pressure of any appreciable magnitude building-up on one or the other side of the cam curve; as the curve moves upwards and downwards in the cylinder.

The cam curve 2 is preferably constructed in a manner to provide guide rails 56, 57 outwardly of the tongues 26, 27 in the direction of movement of the cam curve, these guide rails moving against the inner wall of the cylinder 55. The function of these guide rails is to prevent skewing of the cam curve in the plane of the paper in FIG. 1.

The present invention has the same function, both when the pressure source is an explosion engine and a compressed-air engine.

The function achieved by means of the present invention, where a pressure is built-up beneath the piston as it moves from its uppermost position to its lowermost position, is that upon completing a working stroke, see FIGS. 3 and 5, the piston is turned upwards by the pressure exerted by the gas cushion in the chamber 38 before the return roller forces the piston to move upwards. Consequently, the return roller will come into abutment with the surface 21 on the cam curve 2 as the cam curve moves upwards, and also the return roller. This results in extremely soft and gentle contact of the return roller with the cam curve.

It has been found experimentally that when applying the present invention, an extremely gentle contact can be achieved in comparison with the contact that is achieved when no pressure is built-up beneath the piston.

The present invention thus solves the problem mentioned in the introduction.

Although the invention has been described with reference to a number of exemplifying embodiments thereof, it will be obvious to one skilled in this art that the illustrated and described embodiments can be varied and modified in many ways without departing from the inventive concept of utilizing an increased pressure beneath the piston and therewith causing the piston to turn.

Consequently, the present invention shall not be considered to be limited to the aforedescribed and illustrated embodiments, since these embodiments can be modified within the scope of the following claims.

I claim:

1. An arrangement for converting linear motion from a power source to a rotary motion, wherein the power source is intended to coact with a cam curve so as to generate rotary motion, said rotary motion being performed by an axle; wherein the arrangement includes a first means which comprises a rod (4) which is connected to a piston (31) mounted for reciprocating movement in a cylinder (30; 50) through the action of a pressure medium which is intended to act on that side of the piston (31) which is opposite to that side on which the rod (4) is connected to the piston, and further comprises said cam curve (2) which is mounted on one end of the rod (4) and which has at least two curved parts (20,21) solely on that side thereof which faces away from the rod (4), and wherein the arrangement includes second means which comprises two opposing wing-shaped parts (6, 7) which project outwards away from the axle and which are firmly connected to the axle (3), and wherein a roller (8, 9) is mounted on the outer part of each of said wing-shaped parts and is intended to roll against said cam curve (2), characterized in that the piston rod (4) moves through a hole (36) provided in a lower wall (37) of the lower part of the cylinder, so that the cylinder space located beneath the piston essentially forms a chamber (38); in that when occupying its upper and its lower position, the cam curve will be located on the opposite side of said lower wall (37) in relation to the piston (31); in that said chamber (38) has at least one connection (32, 40;51, 40) with the atmosphere; and in that said connection (32, 40; 51, 40) is so constructed that an overpressure will be generated in the chamber (38) as the piston (31) is moved from its upper position to its lower position.

2. An arrangement according to claim 1, characterized in that the connection (32, 51, 40) has an adjustable constriction.

3. An arrangement according to claim 1, characterized in that said at least one connection includes a connection (32; 51) which in the event of a low pressure drop is intended to allow gas to enter said chamber (38) as the piston (31) moves from its lower to its upper position and is intended to be closed when the piston moves from its upper to its lower position.

4. An arrangement according to claim 3 in which the piston (31) and the cylinder (30) form part of an internal combustion engine, characterized in that said gas is combustion gas.

5. An arrangement according to claim 3, characterized in that said connection (32; 51) is provided with a check value (39) which functions to close said connection when pressure in said chamber (38) increases.

6. An arrangement according to claim 1, characterized by a seal (42) provided between said hole (36) and said piston rod (4), said seal having the form of a floating bushing.

7. An arrangement according to claim 1, characterized in that the curved parts (20, 21) of the cam curve are so configured that when a working stroke is completed and one of the rollers (8, 9) by means of which the working stroke is carried out abuts one curved part (20) of the cam curve (2), the other of said rollers (8, 9) is in at least one of near abutment and abutment with the other curved part (21) of said cam curve.

8. An arrangement according to claim 1, characterized in that the cam curve (2) is provided with a penetrating slot (24, 25) which extends generally parallel with and slightly beneath the curved parts of the cam curve against which a roller (8, 9) abuts during the working stroke and return stroke respectively.

* * * * *